April 9, 1940. L. RANDEL 2,196,230
ARTIFICIAL MINIATURE LANDSCAPE
Filed Aug. 27, 1938 3 Sheets-Sheet 1
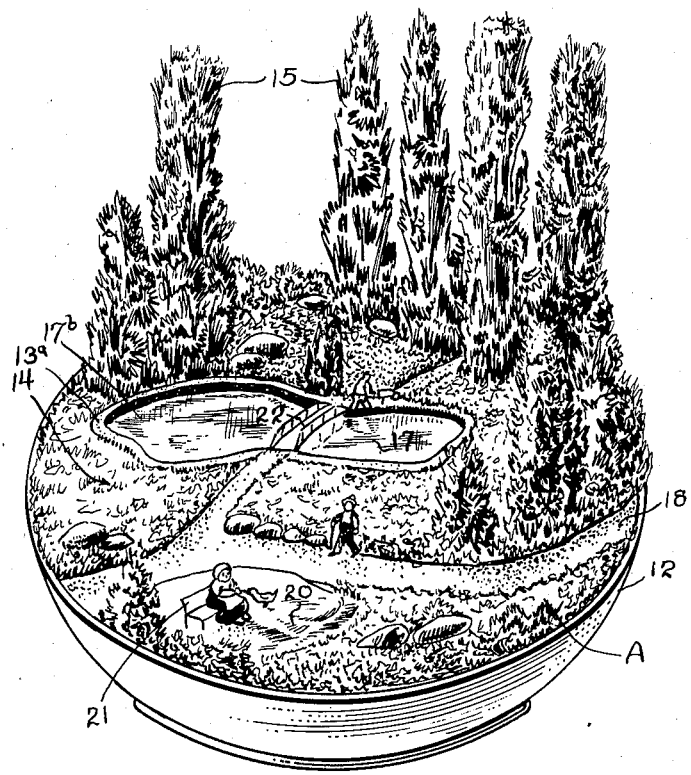
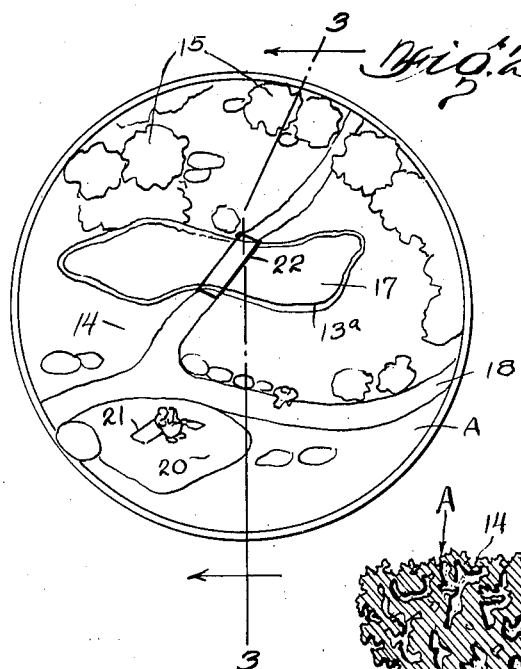
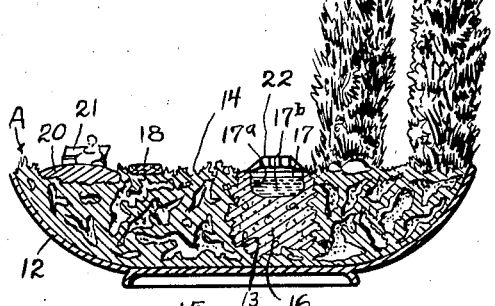
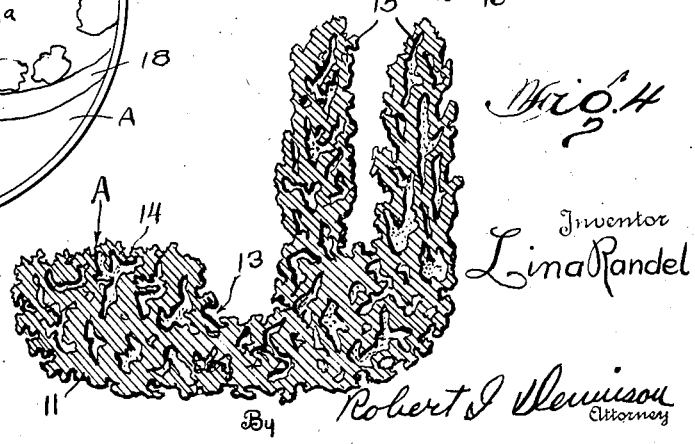
Inventor
Lina Randel
By Robert J. Dennison
Attorney April 9, 1940. L. RANDEL 2,196,230
ARTIFICIAL MINIATURE LANDSCAPE
Filed Aug. 27, 1938 3 Sheets-Sheet 2
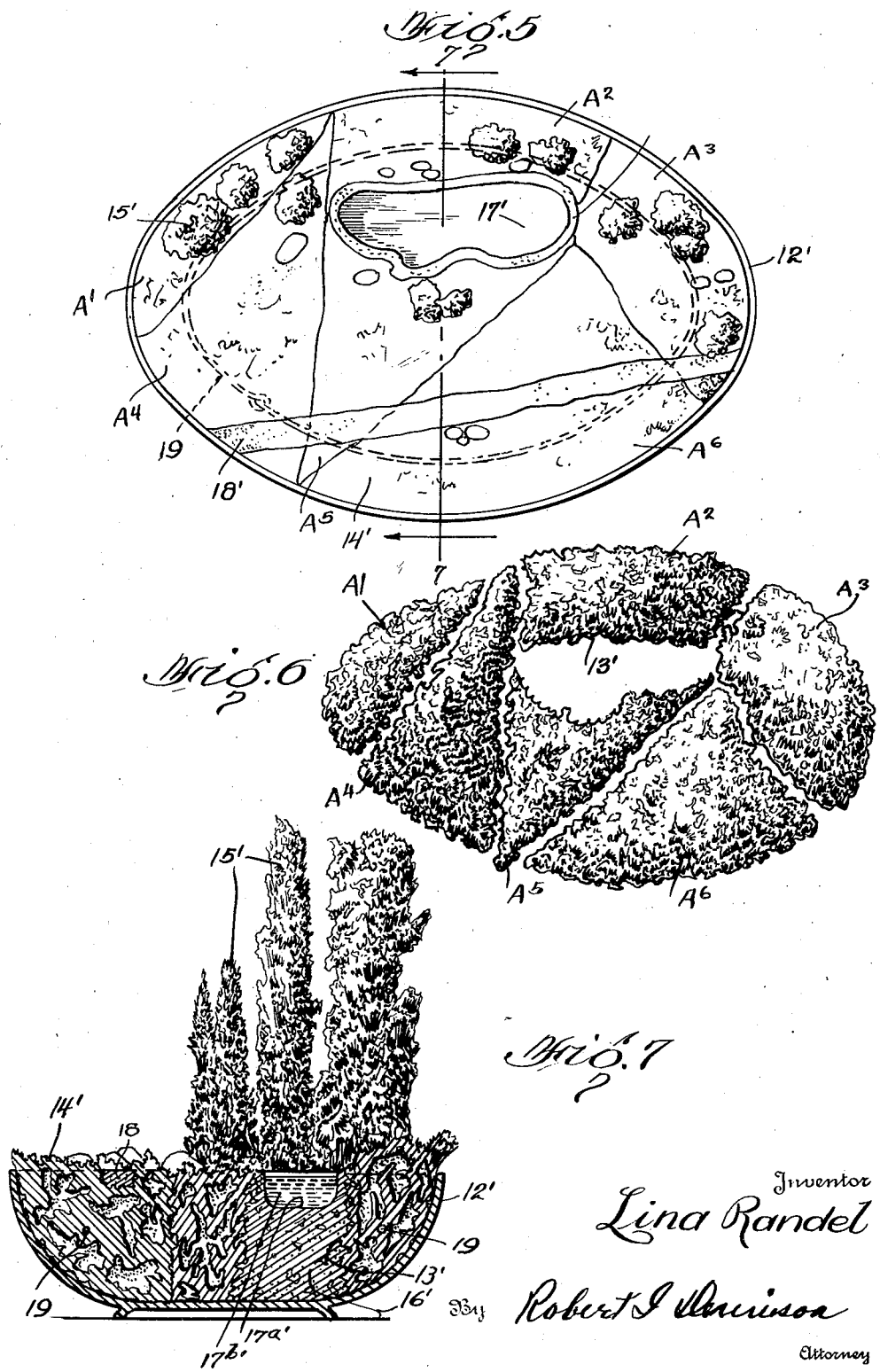
Inventor
Lina Randel
By Robert J. Annison
Attorney April 9, 1940. L. RANDEL 2,196,230
ARTIFICIAL MINIATURE LANDSCAPE
Filed Aug. 27, 1938 3 Sheets-Sheet 3

Inventor
Lina Randel
By Robert J. Dennison
Attorneys

Patented Apr. 9, 1940

2,196,230

UNITED STATES PATENT OFFICE 2,196,230

ARTIFICIAL MINIATURE LANDSCAPE

Lina Randel, New York, N. Y.

Application August 27, 1938, Serial No. 227,188

18 Claims. (Cl. 41—10)

This invention relates to an artificial miniature landscape.

The primary object of the invention is to utilize natural sponge, without disfiguring its natural shape, in creating a very artistic artificial landscape in a miniature size, which furnishes a very desirable ornamentation for homes, showcases, aquariums, windows, and other places where such displays are presentable.

Another feature of the invention resides in an artistic assembly of the relatively light natural sponge in a stable mass, and devising certain ornamental bodies that combine with the sponge in order to furnish anchorage or weight to retain the otherwise fractious sponge material in the receptacle.

A further feature of the invention provides for the use of a character of natural grass variety of sponge that is ordinarily discarded in commercial practice because of their relatively long protuberances known in the trade as "fingers," which character of grass sponge containing the "fingers" is particularly adaptable in creating the landscape of my invention. Moreover, the grass variety of sponge is the cheapest grade on the market, which fact promotes economy in the production of the invention, it being understood of course, that the "Anclote" or basket-shaped type of sponge would not be adaptable to the requirements of the present invention, but all other varieties of grass sponges, such as, Florida Key, Bahama, and Cuba grass sponges serve my purpose with remarkable aptitude.

Further objects of the invention provide for devising an article of manufacture that is strong, compact and durable, that provides employment for manual labor having artistic temperament, and which is comparatively inexpensive to produce.

With the foregoing and other objects in view, the invention consists of a novel combination, construction and arrangement of parts as will hereinafter more fully appear, but it is to be understood that changes, variations and modifications of the invention may be resorted to without departing from the spirit of the invention in the subjoined claims.

In the drawings wherein like characters of reference indicate like parts throughout the several views:

Figure 1 is a perspective view of one form of the invention in which a large single sponge is used in the assembly of the landscape and the particular landscape here selected to illustrate the invention is a rustic garden.

Figure 2 is a top plan view thereof.

Figure 3 is a vertical section taken on the plane of line 3—3 and looking in the direction of the arrows.

Figure 4 is a vertical diametric sectional view through the single sponge selected to construct the landscape shown in Figure 1 and showing the sponge prior to insertion in the receptacle, and prior to applying the way.

Figure 5 is a top plan view of a modified form of the invention where several natural sponges are used in the assembly of the landscape.

Figure 6 is a top plan view of the several sponges prior to assemblage in the receptacle and also prior to applying the way.

Figure 7 is a vertical section taken substantially on the plane of line 7—7 of Figure 5.

Figure 8:
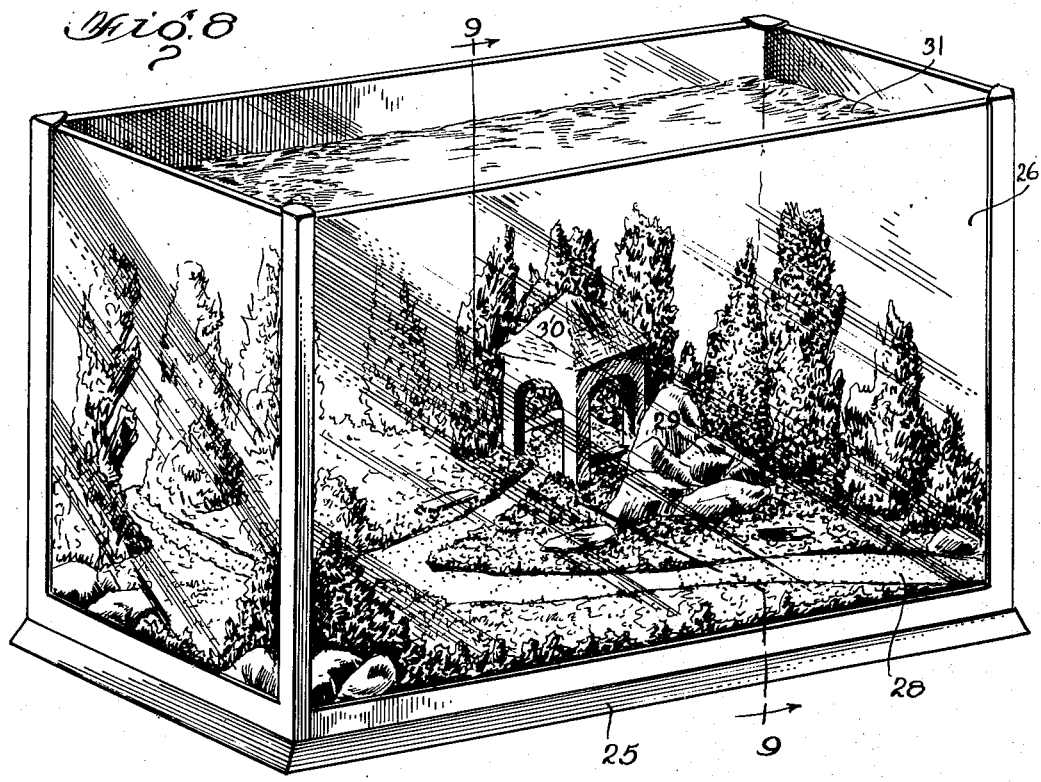
Figure 8 is a perspective view of an aquarium showing another adaptation of the invention therewith.

The first step in preparing the invention is to fix in mind the particular landscape it is desired to produce. With the mental picture certain, it is then necessary for the operator to make a selection of a single sponge, or group of several individual sponges which, when treated and assembled in accordance with the present invention affords the closest approximation to the desired landscape, bearing in mind certain mechanical features that are to be combined in the completed invention.

For the purpose of illustrating the invention, I have selected a rustic garden as my subject, but it will be understood that this rustic garden is only one of the many landscapes capable of being constructed by means of the present invention. When using a single sponge, or a group of sponges, to produce the artificial landscape in miniature, remote points are preferably elevations. The elevations are formed of "fingers" or protuberances, representing in the completed article hills, mountains, trees, and shrubbery in the background, with the more flat portions of the sponge representing land in the foreground of the landscape.

Another important factor to be considered in making the initial selection of the natural sponge, or group of sponges, is the blending of the ways with the landscape in a manner to utilize the light and unwieldly sponge. As here used, ways comprehend any pathway, highway, or waterway. In the initial selection, it is necessary to provide a suitable cavity preferably in the foreground, to accommodate at least one of these ways in the case where a single sponge is used. In the case where a group of sponges are used, the way or ways are provided by a selection which allows for a space between certain sponges of the group. As will hereafter appear, the cavity of the single sponge, and the space in the group of sponges, is treated by depositing a cementitious water resisting material therein in the plastic condition and shaping the material to represent the particular way or ways selected, and which material is to be heavier than the sponge so as to add weight and anchorage to the relatively light sponge body.

Still another factor to be considered in the initial selection of the sponge, or group of sponges, is the adaptability of the sponge, or groups of sponges, to receive and retain analine dyes.

In all forms of the invention illustrated in the drawings, the first treatment of the sponge, or group of sponges, is washing and bleaching. Any commercial washing and bleaching process may be followed, the one preferred being quoted from page 690, "Marine Products of Commerce" by Donald K. Tressler, published by Chemical Catalogue Company of New York in 1923, which process is as follows:

"Soak the sponges for about ten minutes in 5 percent hydrochloric or sulphuric acid, then thoroughly wash in water and place in 5 percent potassium permanganate solution until they have assumed a very dark brown, almost black color; thoroughly wash again in fresh water and place until almost decolorized, in a 10 percent solution of oxalic acid. After another very thorough washing, place them in a 10 percent solution of sodium carbonate (washing soda) until they assume a bright yellow color. A very thorough washing completes the process."

After the sponges are washed and bleached, the parts of the sponge, or parts of the sponges in the groups of sponges, are dipped in analine dyes of the desired color or colors to be used in the rustic garden that has been selected for illustration. The colors preferred are various shades of greens for the relatively flat foreground, and autumn colors in the elevated backgrounds, which parts representing foreground and background will presently appear. The dye bath must be hot, but never is to reach the boiling point.

Now referring to Figures 1 to 4 of the drawings, where a single sponge is used to make the landscape, and which landscape is patterned on a rustic garden, A indicates the sponge body. In this particular form of the invention, the sponge is selected which has a base 11, suitable for seating in a round open receptacle 12, such as a large dish made of earthenware. The sponge body A, as it is selected, is shown in Figure 4, prior to insertion in the receptacle 12.

The sponge body A is selected to have a cavity or depression 13, which is preferably located between the relatively flat upper surface 14 of the sponge, and the protuberances or "fingers" 15 of the sponge. The relatively flat surface 14, in the completed landscape is arranged in the foreground and represents the land part of the landscape, while the irregular protuberances 15 represent hills, mountains, trees, or shrubbery in an elevated background. The sponge is dyed accordingly. That is, the land part 14 of the sponge is dyed with various shades of green, and the background 15 is dyed to the colors most appropriate for hills, mountains, trees, and shrubbery.

It will thus be seen that I have constructed from natural uncut sponges, a miniature, artificial landscape where all of the simulated vegetation in the foreground 14, and background 15, is made entirely of natural sponge having its natural shape. It will also be apparent, that all of the parts simulating land, in the foreground 14, and in the background 15, with the exception of the ways and ornamental weighting features to be presently described, are composed entirely of natural uncut sponge having its natural shape.

The sponge body A, is seated in the receptacle 12 while it is damp because the sponge is more pliable in the damp condition. When the sponge body is seated in the receptacle, the receptacle provides stability for the relatively light body, which when dry would be very unstable for display purposes.

In order to have a useful landscape, it is necessary to incorporate some feature that will serve to retain the landscape seated in the receptacle after the sponge dries. Toward this end, I fill the cavity 13 with heavy water resistant material 16 which provides a way for the landscape, and also a weight to retain the sponge body seated in the receptacle. The material 16 in the cavity 13 provides the simulated waterway 17, while the simulated pathway 18 may be of the same material as the waterway. The pathway 18 does not require a cavity like the cavity 13 for the waterway. The pathway 18 may be made by depositing a thin layer of the material 16 on the surface 14 of the sponge in the desired shape and pressing it into the interstices of the sponge body. By pressing the thin layers of material 16 into the interstices of the sponge body, the layer furnishing the pathway 18 is anchored securely to the sponge body.

The material 16 out of which the ways, including the waterway 17 and pathway 18, are made may be formed of any of the suitable plastics that will harden upon exposure to air. A suitable composition is made from two parts sand and one part cement mixed with sufficient water to provide a plasticity for filling in the cavity 13 and for dishing out a part 17ª thereof to hold water. Other suitable materials 16 may be made of rubber and bitumens, with additional mineral fillers, that are capable of being plasticized by a volatile solvent. While the material 16 is being deposited in the cavity 13 in the plastic condition, it may be tamped slightly to insure that the material engages the interstices of the sponge body to obtain anchorage in the sponge. The edges at the sides of the waterway may be smeared over the upper edges of the cavity 13 to form banks 13ª of the waterway. After the material 16 has dried out, the dished out part 17ª may be filled with water 17ᵇ to form the waterway 17. While I have here described and shown two different ways, namely, the waterway 17 and the pathway 18, it is to be understood that it is only necessary to provide one of the ways to obtain the proper anchorage for retaining the sponge body seated in the receptacle 12. The one way necessary for proper anchorage is the way which is confined in the relatively deep cavity 13, and although I have illustrated this way as the waterway 17, the same may be finished with a smooth upper surface in which event it would function as a representation of a pathway or highway like that shown at 18.

In the form of the invention illustrated in Figures 5, 6 and 7, the landscape in the form of a rustic garden, is made of a group of several individual sponges A1, A2, A3, A4, A5, A6 shown in Fig. 6, prior to their assembly into the desired landscape. This group of sponges is selected so that when the individual sponges are assembled, they will in general conform in shape with the receptacle 12' in which the bases of the individual sponges are seated. In assembling the group of several sponges, it has been necessary to provide a means for holding them together in a composite mass. One of the methods of holding them together is to transfix each sponge with a continuous wire 19, in which case the sponges are threaded or, impaled on a wire loop as shown by the dotted lines in Figure 5.

In making the selection of the group of sponges for this particular landscape, the individual sponges A1, A2, A3 and remote parts of sponges A4 and A5 have protuberances or "fingers" 15', which form the elevated background like in the form of the invention using a single sponge illustrated in Figures 1 to 4 inclusive. The remaining proximate parts of the individual sponges A4, A5, and the entire upper surface of the individual sponge A6 form the relatively flat foreground 14' similar in all respects to the foreground 14 in the form of the invention illustrated in Figures 1 to 4 inclusive.

In the form of the invention shown in Figures 5 to 7 of the drawings, I am able to obtain a firm anchorage with the receptacle 12' by leaving a space 13' between the confronting edges of certain selected sponges A4, A3, A5 and A2 for the material 16'. It is pointed out that the space 13' extends throughout the thickness of the base of the sponges, whereas in the form of the invention illustrated in Figures 1 to 4, the cavity 13 does not contact the bottom of the receptacle 12. Thus, it will be seen that the material 16', which is the same as material 16 heretofore described, engages and congeals with the bottom of receptacle 12' when deposited in the space 13' and unites the composite sponge mass with the receptacle thereby furnishing a very strong anchorage to retain the sponge mass in the receptacle. The material 16' deposited in the space 13' furnishes the simulated waterway 17' similar in all respects to the waterway 17, while the dished out part 17a likewise holds water 17b'. The simulated pathway 18' in this form of the invention shown in Figures 5 to 7 of the drawings, is formed similar to the simulated pathway 18 heretofore described in that form of the invention shown in Figures 1 to 4 inclusive.

In addition to the features of the invention set forth in connection with that form of the invention illustrated in Figures 1 to 4 inclusive, where a single sponge is used; and the form of the invention illustrated in Figures 5 to 7, where a group of sponge is assembled into a compact mass, I may place such small stones 20 on the sponge to represent boulders; and also miniature benches 21; and also a miniature bridge 22 over the waterway, all of which add ornamental weighting features to the relatively light sponge body. While I have been specific in pointing out these additional ornamental weighting features, the invention is not to be limited to the particular kind or location of the additional ornamental weighting features. For example, if the landscape demands it, miniature buildings, windmills, vehicles, imitation animals, and the like may be selected to furnish additional ornamental weighting features or motif. Furthermore, miniature boats and imitation fish may be introduced on the waterways 17 and 17' for that character of landscape that is not used in aquariums.

Figure 9:
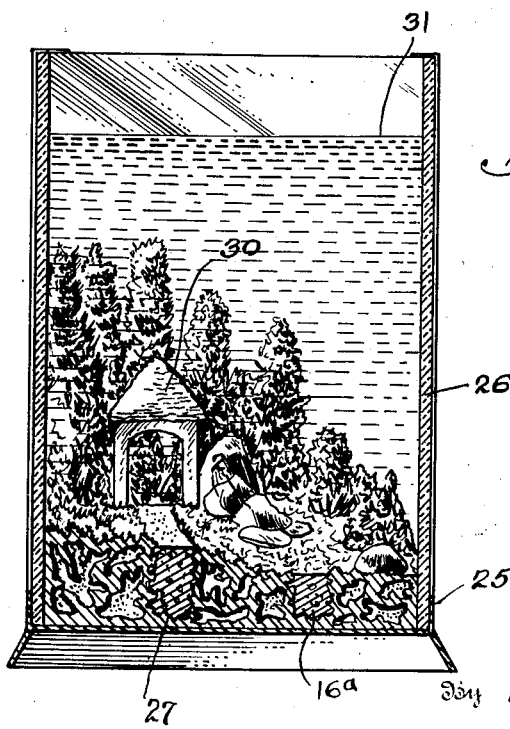
Figure 9 is a vertical section taken substantially on the plane of line 9—9 of Figure 8.

The form of the invention shown in Figures 8 and 9 is adapted for aquariums, which in the form shown, is an aquarium receptacle 25 having higher transparent sides 26 than the dish type receptacle 12 and 12' shown in the other forms of the invention. The only differences between the application of the invention to the aquarium, and the dish type of receptacle being that the foreground 14 and 14' and the background 15 and 15', extend above the top of the receptacle 12 and 12', whereas the entire landscape including foreground and background is confined within the aquarium receptacle 25. In all other respects, the form of the invention shown in Figures 8 and 9, is similar to the form of the invention shown and described in connection with Figures 1 to 4, and 5 to 7 inclusive, except as is distinguished below.

It is obvious that the landscape for an aquarium would have no simulated waterway. In that event, the cavity 21, where a single sponge is used, may be used to make a pathway 28, instead of a waterway 17, as shown in the form of the invention illustrated in Figures 1 to 4 of the invention. While I have shown a single sponge being used for the landscape in the aquarium receptacle 25, it is also pointed out that a group of sponges may be assembled in the aquarium 25, like in that form of the invention described in connection with Figures 5 to 7 inclusive of the drawings. The only difference in this latter case being that the cavity 27 shown would extend to the bottom of receptacle 25, alike in all respects to the space 13' in the form of the invention shown in Figures 5 to 7, except that the material 16a would be smooth on its top surface to simulate a pathway 28 instead of the waterway 17'.

In the form of the invention illustrated in Figures 8 and 9, the additional ornamental weighting features such as boulders 29 and a building 30 may be such as to more closely simulate a marine landscape. When the landscape has been assembled in the aquarium receptacle 25, the receptacle is filled with water 31. Thus it will be seen that the pathway 28 and the boulders 29 and building 30 not only retain the sponge mass in the aquarium receptacle 25, but perform the additional function of maintaining the sponge mass submerged in the water 31.

Thus, it will be seen in all forms of the invention, whether it be made of a single sponge as shown in Figures 1 to 4 inclusive, or made of a group of sponges as shown in Figures 5 to 7 inclusive, or whether the landscape be submerged in an aquarium 25 as shown in Figures 8 and 9, all of the simulated vegetation is composed entirely of a natural sponge body, and having its natural shape. Furthermore, all of the simulated land, in the landscapes of all forms of the invention, with the exception of the ways 17, 18; and 17' and 18'; and the way 28; and the additional ornamental weighting features such as boulders, benches, etc. are composed entirely of natural sponge in its natural shape.

Having described my invention, what I claim is:

1. An artificial miniature landscape in which all of the simulated vegetation is composed of natural sponge in its original shape.

2. An artificial miniature landscape in which a substantial part of the simulated land is composed of natural sponge in its original shape.

3. An artificial miniature landscape in which all of the simulated vegetation is composed of natural uncut sponge, and said sponge having a portion thereof colored differently from the color of natural sponge.

4. An artificial miniature landscape in which a substantial part of the simulated land is composed of natural uncut sponge, and a portion of that part simulating land being colored differently from the color of natural sponge.

5. An artificial miniature landscape including a portion simulating land and another portion simulating vegetation, said portion simulating vegetation being composed entirely of natural uncut sponge, and said portion simulating land being composed in part of natural sponge.

6. An artificial miniature landscape including a portion simulating land and another portion simulating vegetation, said portion simulating vegetation being composed entirely of natural sponge, said portion simulating land being composed in part of natural uncut sponge, and said sponge portions simulating land and vegetation being colored differently from the natural color of sponge.

7. An artificial miniature landscape including portions simulating land, vegetation, and a way, the portions simulating land and vegetation being composed in part of natural sponge in its original shape, and the way being formed of water resistant material heavier than the sponge.

8. An artificial miniature landscape in which all portions thereof simulating vegetation is composed of a sponge body, said sponge body being formed of a plurality of separate natural sponges each of which is equipped with its original shape, and means to secure the sponges together to form a composite mass.

9. An artificial miniature landscape including a portion simulating land and another portion simulating vegetation, said simulated land and vegetation being formed in part of a plurality of separate natural sponges each of which is equipped with its original shape, and means to secure the sponges together to form a composite mass.

10. An artificial miniature landscape including portions simulating land, vegetation, and a way, the portions simulating land and vegetation being composed in part of a plurality of separate sponges each of which is equipped with its original shape, means for securing the sponges together to form a composite mass, and said way being formed of a water resisting material heavier than sponge and anchored in the interstices of certain of the sponges.

11. An artificial miniature landscape in which portions simulating land and vegetation are composed in part of uncut sponge, a weighted body engaging with the sponge to provide a relative amount of stability to the sponge, and said weighted body providing an ornamental visable feature of the landscape.

12. An artificial miniature landscape including portions simulating land, vegetation, and a way, the portions simulating land and vegetation being composed in part of a plurality of separate sponges having a space between certain of the sponges, and a mass of water resisting material disposed in the space and engaging said certain sponges and providing a way.

13. An article of manufacture comprising a receptacle, an artificial miniature landscape composed in part of natural sponge in its original shape, and a portion of the sponge seated in the receptacle to provide stability to the landscape.

14. An article of manufacture comprising a receptacle, an artificial miniature landscape in which all the vegetation thereof is composed of a natural sponge body in its original shape, and a part of the sponge body being seated in the receptacle to provide stability for the landscape.

15. An article of manufacture comprising a receptacle, an artificial miniature landscape in which all portions thereof simulating vegetation are composed of a natural sponge body in its original shape, portions of the landscape simulating land being composed in part of a natural sponge in its original shape, and a part of the sponge body being seated in the receptacle to provide stability for the landscape.

16. An article of manufacture comprising a receptacle, an artificial miniature landscape including portions simulating land, vegetation, and a way, the portions simulating land and vegetation being composed in part of a natural uncut sponge body, and a portion of the sponge body being seated in the receptacle to provide stability to the landscape, said portion simulating the way being formed of water resisting material heavier than sponge and engaging the sponge body to aid in retaining the landscape in the receptacle.

17. An article of manufacture comprising a receptacle, an artificial miniature landscape including a portion simulating land, vegetation, and a way, said portions simulating land and vegetation being composed in part of a plurality of separate natural sponges each of which is equipped with its original shape, certain of the sponges having a space therebetween, a mass of water resisting material disposed in the space and having a shape constituting a way of the landscape, and certain portions of the sponges being seated in the receptacle to provide stability to the landscape.

18. An article of manufacture comprising a receptacle, an artificial miniature landscape including a portion simulating land, vegetation, and a way, said portions simulating land and vegetation being composed in part of a plurality of separate natural sponges each of which is equipped with its original shape, certain of the sponges having a space therebetween, a mass of water resisting material disposed in the space and having a shape constituting a way of the landscape, certain portions of the sponges being seated in the receptacle to provide stability to the landscape, and means engaging each sponge to secure them together in a compact mass.

LINA RANDEL.